(12) United States Patent
Takano et al.

(10) Patent No.: US 7,565,891 B2
(45) Date of Patent: Jul. 28, 2009

(54) ENGINE FOR VEHICLE

(75) Inventors: Kiyohito Takano, Kobe (JP); Noboru Meguro, Takasago (JP)

(73) Assignee: Kawasaki Jukogyo Kabushiki Kaisha, Hyogo (JP)

(*) Notice: Subject to any disclaimer, the term of this patent is extended or adjusted under 35 U.S.C. 154(b) by 12 days.

(21) Appl. No.: 11/902,331

(22) Filed: Sep. 20, 2007

(65) Prior Publication Data

US 2008/0066711 A1 Mar. 20, 2008

(30) Foreign Application Priority Data

Sep. 20, 2006 (JP) .............................. 2006-254190

(51) Int. Cl.
*F02B 75/22* (2006.01)
(52) U.S. Cl. ............................. 123/195 R; 123/195 AC
(58) Field of Classification Search .............. 123/197.1, 123/195 R, 195 AC See application file for complete search history.

(56) References Cited

U.S. PATENT DOCUMENTS 6,799,485 B1 10/2004 Kawamoto et al.

FOREIGN PATENT DOCUMENTS

JP 2003-278893 10/2003

*Primary Examiner*—Noah Kamen
(74) *Attorney, Agent, or Firm*—Wenderoth, Lind & Ponack, L.L.P.

(57) ABSTRACT

An engine for a vehicle including a crankcase having a crank room and a transmission room partitioned from the crank room by a partition wall, the transmission room housing a gear transmission having a gear train for backward movement and reserving oil of the engine. The gear train has a reverse drive gear provided on an input shaft of the gear transmission, a reverse driven gear provided on an output shaft of the gear transmission, and a reverse idle gear provided on a reverse idle shaft so as to be coupled with the reserve drive gear and the reserve driven gear. The input shaft and the reverse idle shaft are arranged so as to be divided into the upper side and the lower side of a reference line connecting an axis of the crankshaft and an axis of the output shaft. The reverse idle gear is arranged in a space surrounded by the reverse drive gear, the reverse driven gear and the partition wall.

9 Claims, 9 Drawing Sheets

ENGINE FOR VEHICLE

BACKGROUND OF THE INVENTION

1. Field of the Invention

The present invention relates to an engine for a vehicle including a crankshaft room for housing a crankshaft and a transmission room partitioned from the crank room by a partition wall, the transmission room housing a gear transmission having a gear train for backward movement and reserving oil of the engine.

2. Description of the Related Art

FIG. 9 shows an example of above mentioned type engine for a vehicle. In FIG. 9, a crankcase 300 is partitioned into a front crank room 301 and a rear transmission room 302 by a partition wall 303 having a predetermined height. The crankshaft room 301 houses a crankshaft 305a. The transmission room 302 houses a gear transmission having a gear train 305 for backward movement. Further, the transmission room 302 reserves oil in a lower portion thereof.

The gear train 305 for backward movement has a low gear 311 provided on an input shaft 310 of the gear transmission, a reverse driven gear 313 provided on an output shaft 312 of the gear transmission, and reverse idle gears 315 and 316 provided on a reverse idle shaft 317 and engaged with the low gear 311 and the reverse driven gear 313 respectively. The input shaft 310 is arranged between the crankshaft 305 and the output shaft 312 in a forward and backward direction (i.e. front to back) of the vehicle. The reverse idle shaft 317 is arranged above the input shaft 310 and the output shaft 312.

FIG. 10 is an enlarged view in section taken along line X-X of FIG. 9. The reverse idle shaft 317 arranged above the input shaft 310 is extended over the entire lateral width (right and left width) of the crankcase 300 and is rotatably supported by the left and right side walls of the crankcase 300 via bearings 322. The reverse idle gears 316 and 315 are formed on the left and right ends of the reverse idle shaft 317.

As shown in FIGS. 9 and 10, the input shaft 310 is arranged between the crankshaft 305 and the output shaft 312 from front to back, and the reverse idle shaft 317 is arranged above the output shaft 312 and the input shaft 310. In such a configuration, the size of the engine in a vertical direction is increased, as seen in the crankshaft direction. Further, since the reverse idle shaft 317 is arranged above the output shaft 312 and the like, a top wall of the crankcase 300 protrudes upward, thereby, the arrangement space for engine parts e.g., a starter motor, arranged on a top surface of the crankcase 300 is limited. Furthermore, the size of the engine for the vehicle in the vertical direction is increased so that a ground clearance of the vehicle is decreased.

To address such problems, the present inventors have developed an engine for a vehicle, as disclosed in U.S. Pat. No. 6,799,485B1, wherein the reverse idle shaft is arranged below the input shaft of a gear transmission, and the reverse idle gear mounted on the reverse idle shaft is arranged across a transmission case and the generator case.

However, in the case of above-mentioned engine, so that the reverse idle gear can be arranged across the transmission case and the generator case, a notch for inserting the reverse idle gear thereinto must be formed in a partition wall for partitioning both the cases, as a result, both the cases communicate with each other through the notch. An oil reservoir (oil pan portion) must be formed in the transmission case to prevent backflow of the oil to the generator case through the notch. Therefore, it is difficult to make a crankcase having a compact transmission case and maintain a sufficient amount of the oil in the oil reservoir. The notch in the partition wall affects the strength of the crankcase around the reverse idle gear. This also makes it difficult to make the crankcase compact.

SUMMARY OF THE INVENTION

The present invention addresses the above-described problems, and an object of the present invention is to provide an engine for a vehicle that is lightweight and compact and can reduce the size of a crankcase in the vertical direction, thereby securing a space for easily arranging auxiliary equipment on the top portion of the crankcase and can reserve a sufficient amount of the oil.

To address the above problems, the present invention provides an engine for a vehicle including a crankcase having a crank room for housing a crankshaft and a transmission room formed rearward of the crank room and partitioned from the crank room by a partition wall, the transmission room housing a gear transmission having a gear train for backward movement and reserving oil of the engine, wherein the gear train for backward movement has a reverse drive gear provided on an input shaft of the gear transmission, a reverse driven gear provided on an output shaft of the gear transmission, and a reverse idle gear provided on an reverse idle shaft so as to be coupled with the reverse drive gear and reverse driven gear, wherein the input shaft and the reverse idle shaft are arranged so as to be separated into the upper side and the lower side of a reference line connecting an axis of the crankshaft and an axis of the output shaft, and wherein the reverse idle gear is arranged in a space surrounded by the reverse drive gear, the reverse driven gear and the partition wall.

With this configuration, since an available space between the shafts and gears in the gear transmission can be effectively used to arrange the reverse idle shaft and the reverse idle gear for the backward movement of the vehicle, the size of the engine from front to back can be prevented from being increased. Particularly, the size of the engine in the vertical direction can be compact and the ground clearance of the vehicle can be larger.

According to the present invention, preferably, the axis of the input shaft and the axis of the reverse idle shaft may be arranged so as to be substantially symmetric with respect to the reference line.

With this configuration, the gear transmission and the engine can be more compact, as seen in the crankshaft axis direction.

According to the present invention, preferably, both axial ends of the reverse idle shaft may be supported by one of side walls of the crankcase in the crankshaft axis direction and a shaft holder fixed to the side wall.

With this configuration, the reverse idle gear and the reverse idle shaft can be easily assembled, and the reverse idle shaft becomes shorter to reduce the weight and the shaft arrangement space. Further, since the reverse idle shaft becomes shorter and is straddle-supported, a bending moment of the reverse idle shaft becomes smaller to prevent any gear noise.

According to the present invention, preferably, the shaft holder may have three mounted portions which are extended, as seen in the crankshaft axis direction, into a space between the reverse drive gear and the partition wall, a space between the reverse drive gear and a change drum for shifting a gear position of the gear transmission and positioned below the idle shaft, and a space between the change drum and the partition wall respectively, and are mounted on the side wall by mounting bolts.

With this configuration, the mounted portions of the shaft holder are disposed using spaces caused between members of the gear transmission, therefore, the gear transmission and the engine can be more compact, as seen in the crankshaft axis direction.

According to the present invention, preferably, the side wall may have mounting surfaces for mounting the shaft holder, the mounted surfaces protrude toward the shaft holder in the crankshaft axis direction, and the mounted portions of the shaft holder are fixed on the mounting surfaces.

With this configuration, the length of female screw holes formed in the mounting surfaces can be longer, and the thickness of the mounted portions of the shaft holder can become smaller, thereby the mounting strength of the shaft holder can be improved.

According to the present invention, preferably, the lower end of the reverse idle gear may be positioned above an oil level of the oil in the transmission room at least during operation of the engine.

With this configuration, the reverse idle gear for backward movement is rotated without being subjected to stirring resistance of the oil during operation of the engine. The gear transmission efficiency of the torque of the engine can be improved to reduce the output loss.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENT

FIGS. 1 to 8 show an embodiment of an engine for a vehicle according to the present invention and a straddle-type four wheeled vehicle on which the engine is mounted. An embodiment of the present invention will be described based on these drawings. In this case, in a concept of directions used for the following description, a front side as seen from a rider riding on the vehicle shown in FIG. 1, that is, a direction in which the vehicle moves forward is called a front side of the vehicle and the engine, except as otherwise specified.

Figure 1:
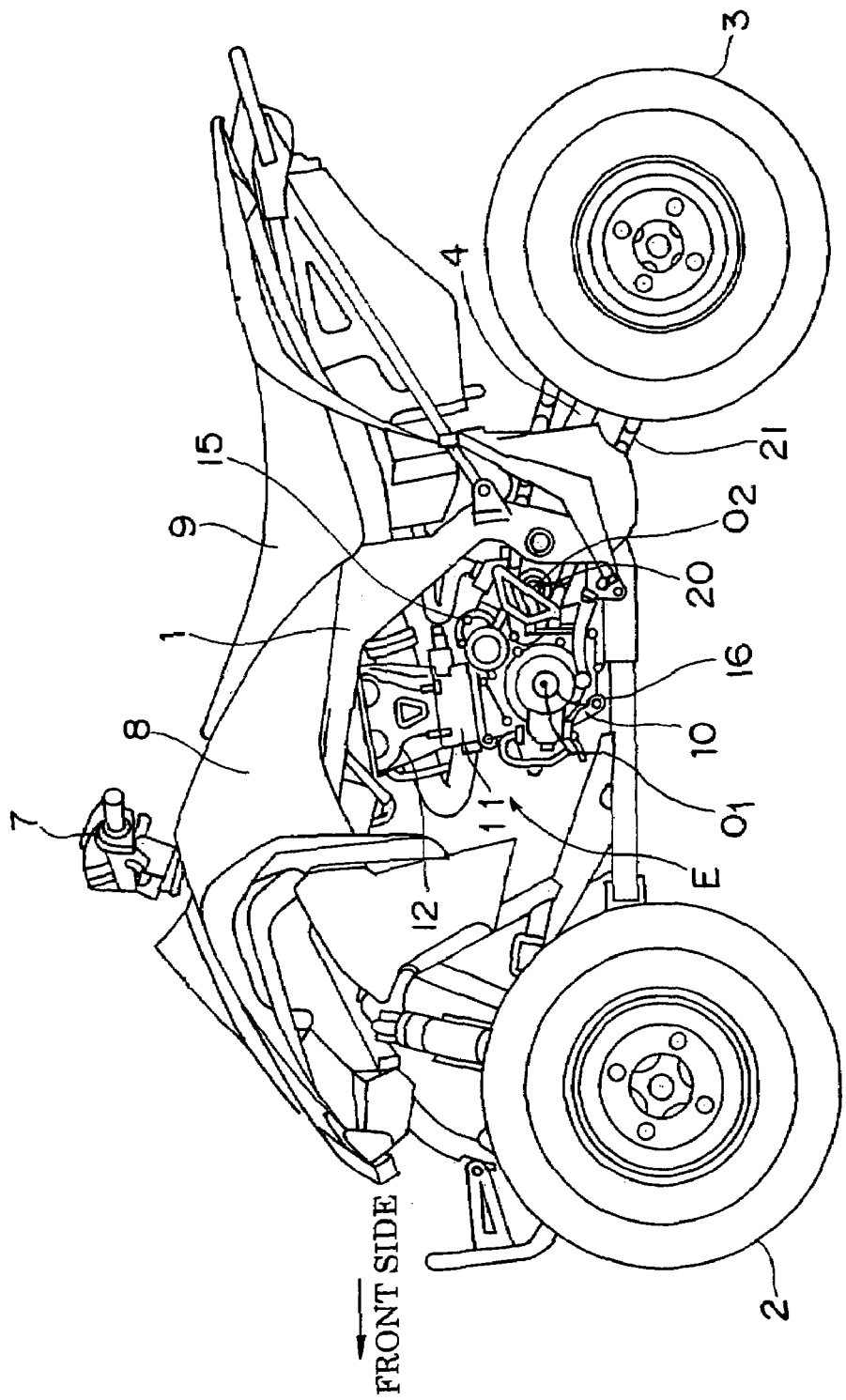
FIG. 1 is a left side view showing a straddle-type four wheeled vehicle on which an engine for a vehicle according to a preferred embodiment of the present invention is mounted.

FIG. 1 is a left side view of the straddle-type four wheeled vehicle. A pair of left and right front wheels 2 support a front portion of a body frame 1 of the vehicle. A pair of left and right rear wheels 3 support a rear portion of the body frame 1 via a swing arm 4. An engine E is mounted in a space between the front wheels 2 and the rear wheels 3. The body frame 1 has, in its upper portion, a steering wheel device 7 for steering the vehicle, a fuel tank 8, and a seat 9 for the rider, in this order from the front side. A body of the engine E is composed of a crankcase 10, a cylinder block 11 fastened to an upper surface of a front portion of the crankcase 10, and a cylinder head 12 fastened to an upper surface of the cylinder block 11. A starter motor 15 is arranged on an upper surface of the crankcase 10 near a rear surface of the cylinder block 11. A generator cover 16 is detachably attached to a left side surface of the crankcase 10.

The vehicle employs a chain driving method in which a rotation power for driving the vehicle generated by the engine is transmitted from an output sprocket 20 arranged on a left side of a rear portion of the crankcase 10 to the rear wheels 3 via a driving chain 21.

Figure 2:
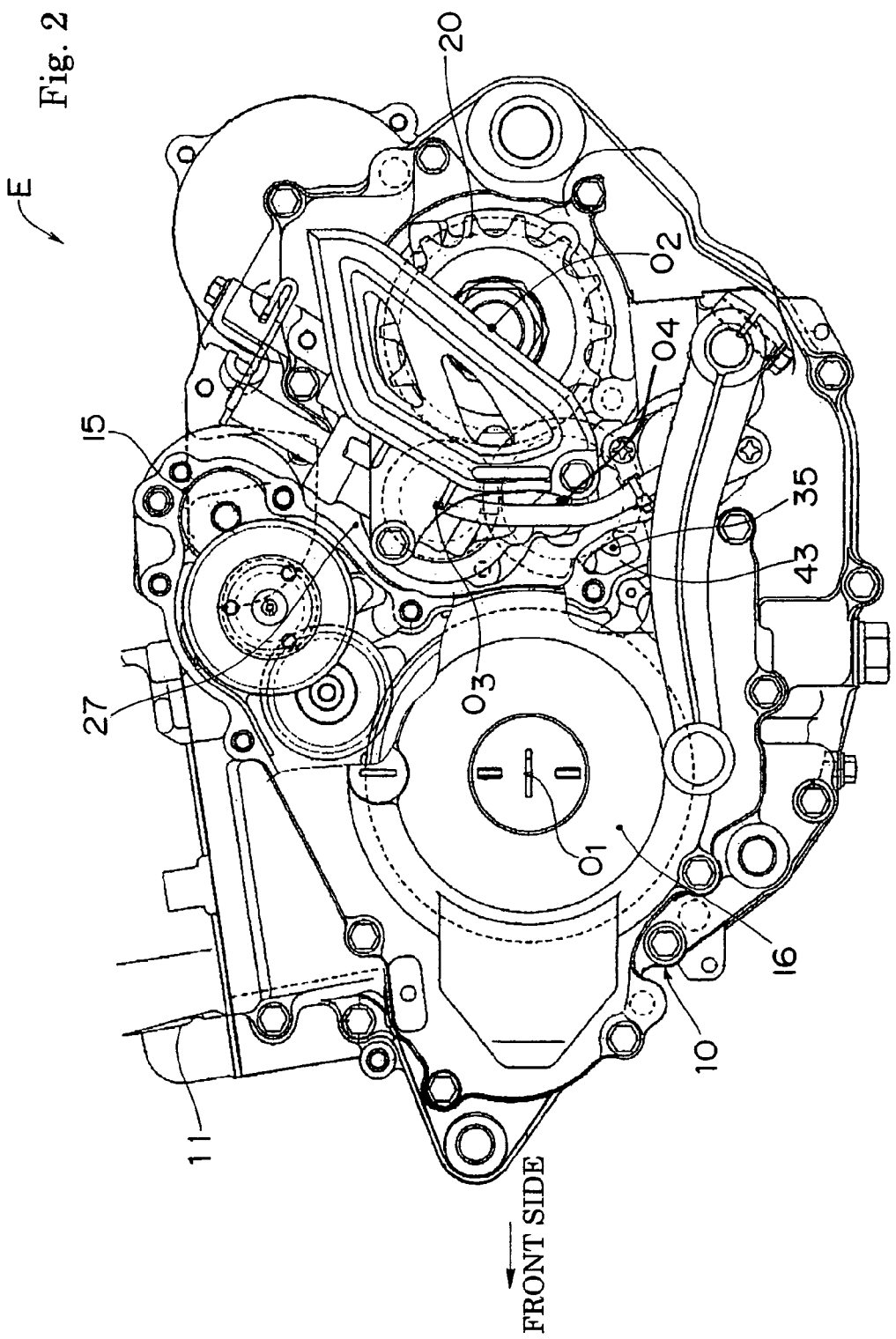
FIG. 2 is a left side view of the engine of FIG. 1, from which part of a generator cover is removed.
Figure 3:
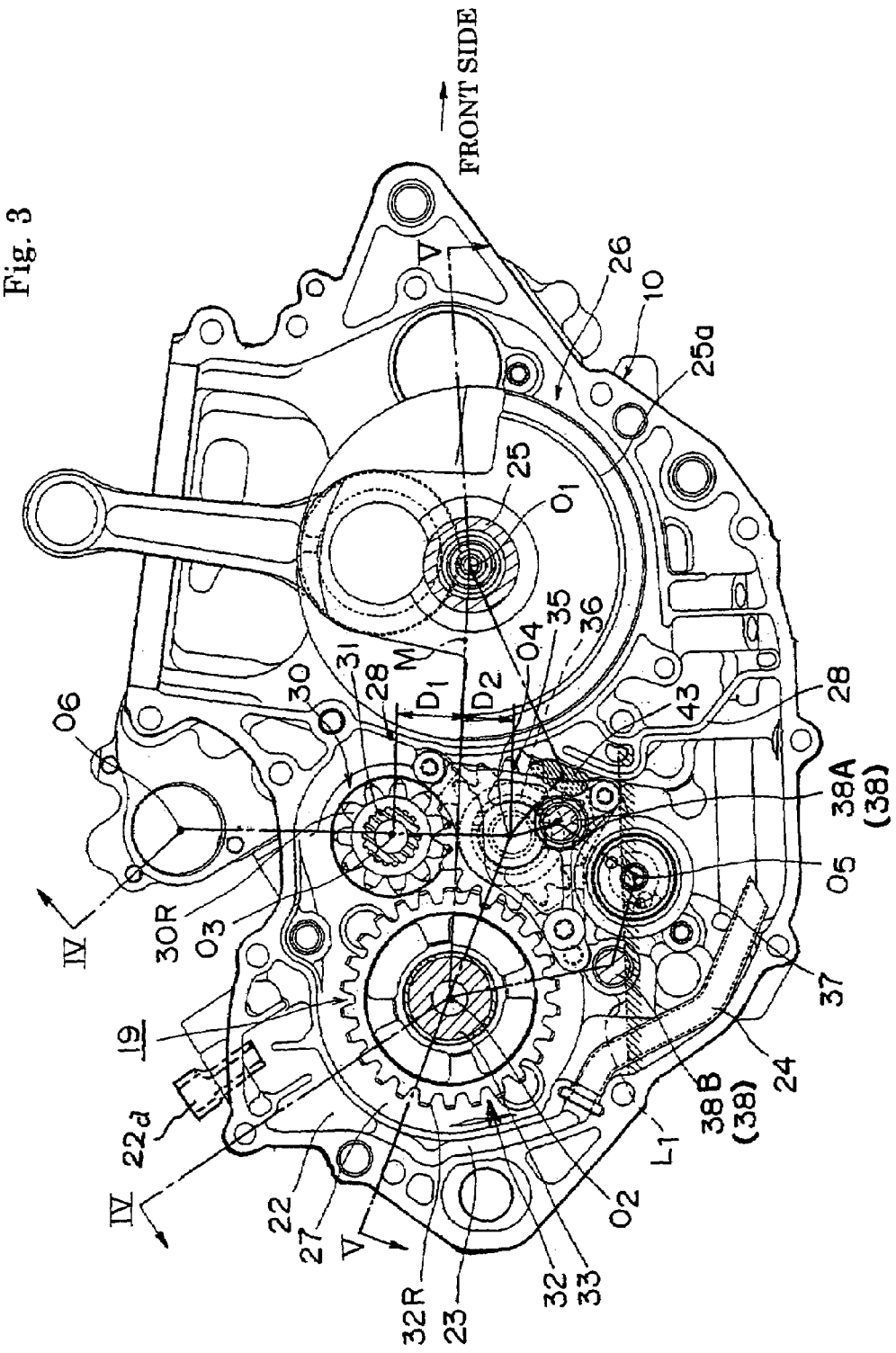
FIG. 3 is a longitudinal right side cross-sectional view of the engine of FIG. 2.
Figure 4:
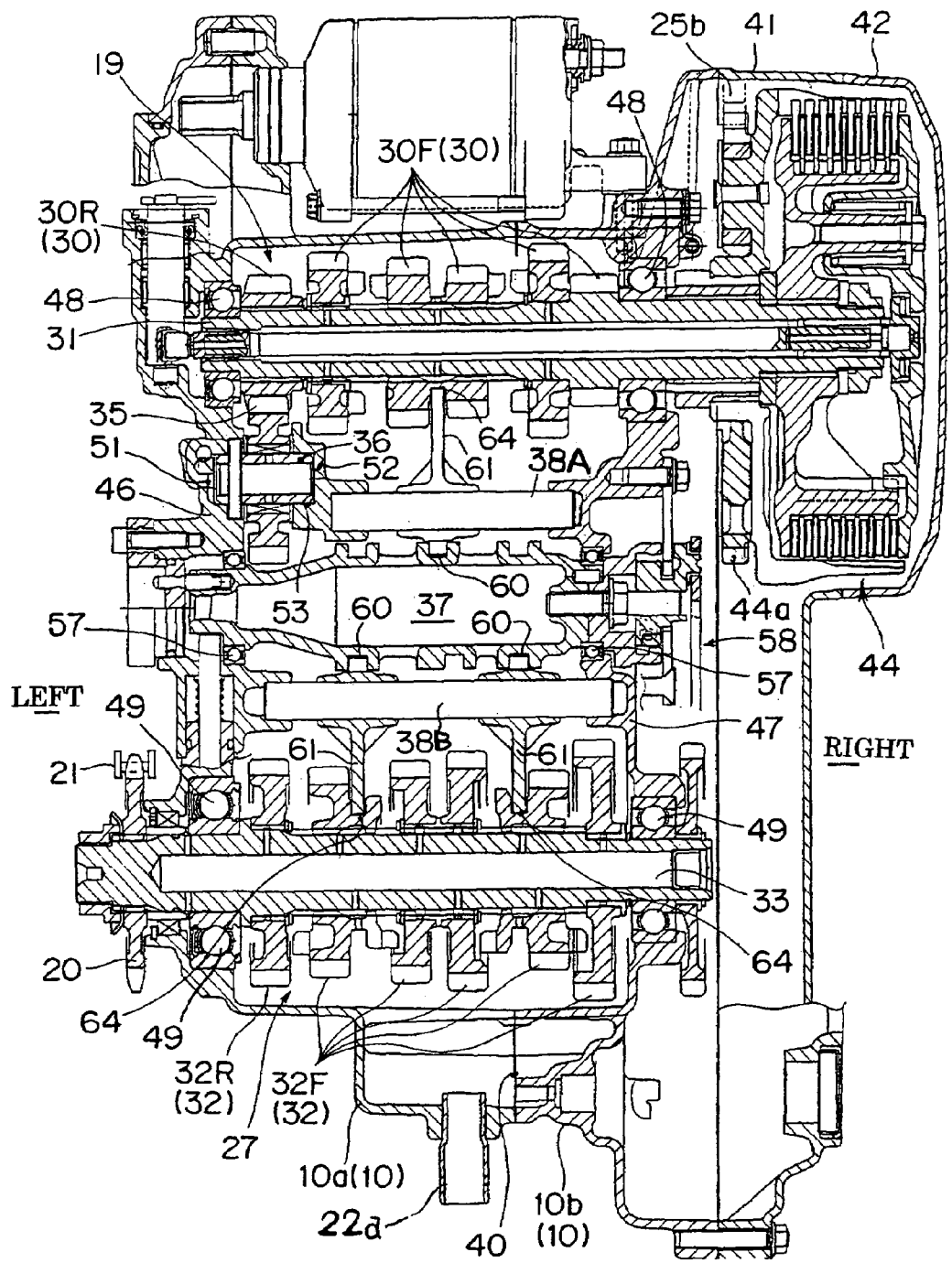
FIG. 4 is a developed view in section taken along line IV-IV of FIG. 3.
Figure 5:
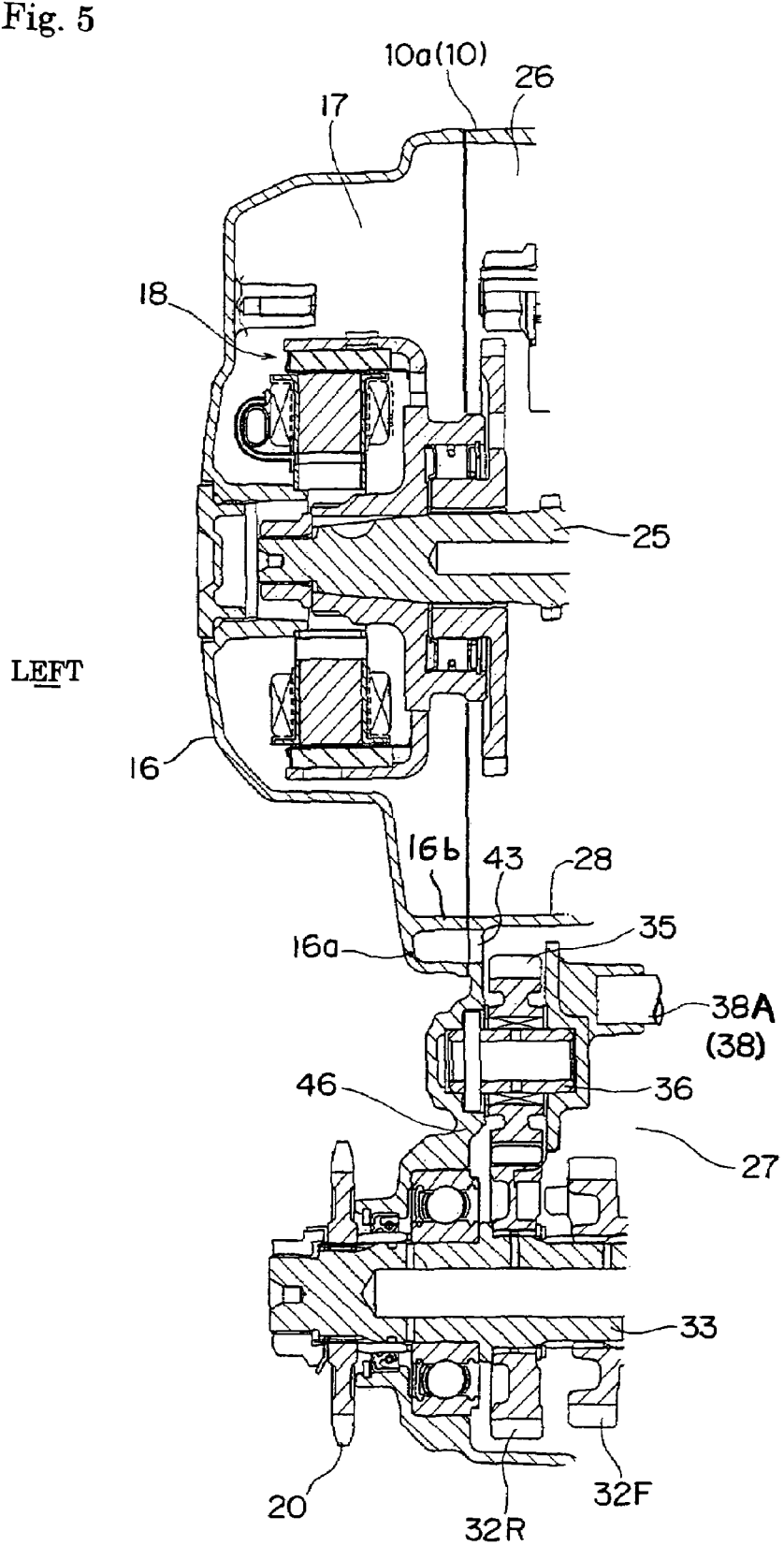
FIG. 5 is a developed view in section taken along line V-V of FIG. 3.

FIG. 2 is a left side view of the engine E from which part of the generator cover 16 is removed, FIG. 3 is a longitudinal right side cross-sectional view of the engine E, FIG. 4 is a developed view in section taken along line IV-IV of FIG. 3, and FIG. 5 is a developed view in section taken along line V-V of FIG. 3.

In FIG. 3, the front portion of the crankcase 10 has a crankshaft room 26 for housing a crankshaft 25. A rear portion of the crankcase 10 has a transmission room 27 for housing a gear transmission 19. The crankshaft room 26 and the transmission room 27 are partitioned by a partition wall 28 in such a manner that oil cannot flow directly between rooms 26 and 27. The partition wall 28 is continuously formed from a top wall to a bottom wall of the crankcase 10. As seen in the crankshaft axis direction, the partition wall 28 is formed in a substantially arc shape along a rotation track at an outer peripheral end of a balance weight portion 25a of the crankshaft 25. The oil for lubrication is reserved in an oil reservoir formed in a lower portion of the transmission room 27 at a predetermined level L1. A breather case 22 is formed on an upper and rear end portion of the crankcase 10. A lower end of the breather case 22 communicates with an oil return passage 23 for returning the oil separated from oil mist entered in the breather case which oil vapor is separated. The oil return passage 23 is extended downward in a rear end wall of the crankcase 10. The lower end of the oil return passage 23 is connected to an oil return hose 24. The oil return hose 24 is inserted into the oil in the oil reservoir in the transmission room 27 and is opened in the oil. The breather case 22 is provided with an air passage 22a for releasing blowby gas separated from the oil mist in the breather case.

In FIG. 5, a generator room 17 is located at a left side of the crankshaft room 26 and surrounded by the generator cover 16. The generator room 17 houses a generator mechanism 18. The generator room 17 communicates with the crankshaft room 26. The generator room 17 and the transmission room 27 are isolated from each other by the partition wall 28 and a partition wall portion 16b formed on the generator cover. The partition wall 28 partitions the crankshaft room 26 and the transmission room 27 as mentioned above, and the partition wall portion 16b is positioned so as to correspond to the partition wall 28.

An operating hole 43 is formed in a left side wall 46 of the crankcase 10 outside the partition wall 28. The operating hole 43 is extended through the left side wall 46 in the left and right direction (in the vehicle width direction) and is positioned so as to face a part of a later-described reverse idle gear 35 for backward movement of the vehicle. The operating hole 43 is sized so that an assembling operator can insert a few fingers into the operating hole 43. However, on assembling, that is, on attaching the generator cover 16, the operating hole 43 is closed from outside by a closing portion 16a of the generator cover 16. The operating hole 43 is represented by diagonal lines (not diagonal lines for a cross section) to clarify its shape in FIGS. 3 and 6.

In FIG. 4, the crankcase 10 is divided into a left crankcase member 10a and a right crankcase member 10b by a vertical dividing surface (mating surface) 40 substantially at a center portion of a width of the crankcase 10 in the right and left direction (in the vehicle width direction). A clutch case 41 and a clutch cover 42 are successively fastened to a right end surface of the crankcase 10. The clutch case 41 houses a multi disc friction clutch 44.

In FIG. 3, the gear transmission 19 includes an input shaft 31 provided with drive gears 30 for shifting, an output shaft 33 provided with driven gears 32, a reverse idle shaft 36 for backward movement of the vehicle provided with the reverse idle gear 35, a change drum 37 for shifting a gear position of the gear transmission 19, and a pair of shift fork shafts 38. The output shaft 33 is arranged in a rear portion of the transmission room 27. An axis O2 of the output shaft 33 is positioned slightly above an axis O1 of the crankshaft 25. The input shaft 31 and the reverse idle shaft 36 are arranged between the output shaft 33 and the partition wall 28 from front to back.

A line M connecting the axis O1 of the crankshaft 25 and the axis O2 of the output shaft 33 is referred as a reference line of a layout of the shafts of the gear transmission 19. An axis O3 of the input shaft 31 and an axis O4 of the reverse idle shaft 36 are positioned so as to be substantially symmetric with respect to the reference line M. The input shaft 31 is arranged in such a manner that the axis O3 is positioned above the reference line M by a predetermined distance D1. The reverse idle shaft 36 is arranged in such a manner that the axis O4 is positioned substantially just below the axis O3 of the input shaft 31 and is positioned below the reference line M by a predetermined distance D2 which is substantially the same as the predetermined distance D1. The change drum 37 is arranged in such a manner that an axis O5 is positioned downwardly and backwardly of the axis O4 of the reverse idle shaft 36 and is positioned forwardly and downwardly of the axis O2 of the output shaft 33. A front shift fork shaft 38A which is one of the shift fork shafts 38 is positioned forwardly and upwardly of the change drum 37. A rear shift fork shaft 38B which is other one of the shift fork shafts 38 is positioned substantially just backwardly of the change drum 37.

In FIG. 4, the input shaft 31 is rotatably supported by left and right side walls 46 and 47 of the crankcase 10 via bearings 48. A right end of the input shaft 31 is extended into the clutch case 41. The multi disc friction clutch 44 is mounted on the right end of the input shaft 31. A left end gear 30R of the drive gears 30 provided on the input shaft 31 is a reverse drive gear for backward movement of the vehicle. Remaining five gears 30F of the drive gears 30 are forward drive gears for forward movement of the vehicle. Both axial ends of the output shaft 33 are rotatably supported by the left and right side walls 46 and 47 of the crankcase 10 via bearings 49 respectively. A left end of the output shaft 33 is protruded leftward from the left side wall 46 of the crankcase 10. The output sprocket 20 is fixed to the protruded end of the output shaft 33. A left end gear 32R of the driven gears 32 provided on the output shaft 33 is a reverse driven gear for backward movement of the vehicle. Remaining five gears 32F are forward driven gears for forward movement of the vehicle. The forward driven gears 32F are engaged with the forward drive gears 30F on the input shaft 31, respectively.

Figure 7:
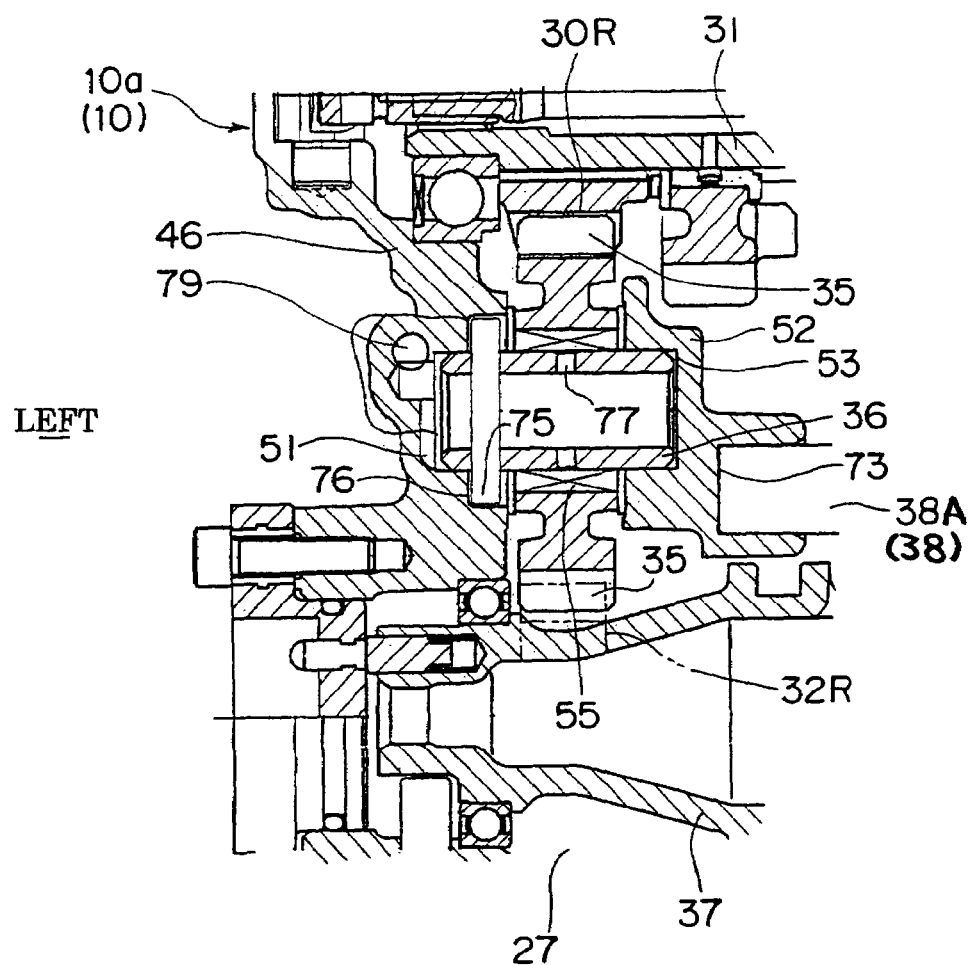
FIG. 7 is a cross-sectional view taken along line VII-VII of FIG. 6.

In FIGS. 4 and 7, the reverse idle shaft 36 is positioned near the left end of the transmission room 27. The left and right ends of the reverse idle shaft 36 are straddle-supported by a support recess portion 51 formed in the left side wall 46 of the crankcase 10 and a support recess portion 53 of a shaft holder 52 mounted on the left side wall 46 of the crankcase 10. The reverse idle gear 35 is rotatably fitted onto an outer peripheral surface of the reverse idle shaft 36 via a needle bearing 55 and is engaged with the reverse drive gear 30R and the reverse driven gear 32R. The reverse drive gear 30R, the reverse idle gear 35 and the reverse driven gear 32R constitute a gear train for backward movement of the vehicle.

In FIG. 4, the change drum 37 provided below the idle shaft 36 is rotatably supported by the left and right side walls 46 and 47 of the crankcase 10 via bearings 57 and is rotated by a swing arm mechanism 58 at a predetermined angle. Three shift cam grooves 60 for shifting are formed on the outer peripheral surface of the change drum 37. The shift cam grooves 60 are engaged with drive pins of shift forks 61, respectively. The shift forks 61 are supported by the shift fork shafts 38 so as to be moved in the axial direction of the shift fork shafts 38 and are engaged with particular gear annular grooves 64 of the drive gears 30 and the driven gears 32. The change drum 37 is rotated at the predetermined angle, whereby the shift forks 61 are selectively moved in the axial direction of the shift fork shafts 38 to change an engaged state of the drive gears 30 and the driven gears 32. Shift-up, shift-down, or shift to backward movement is performed.

Figure 6:
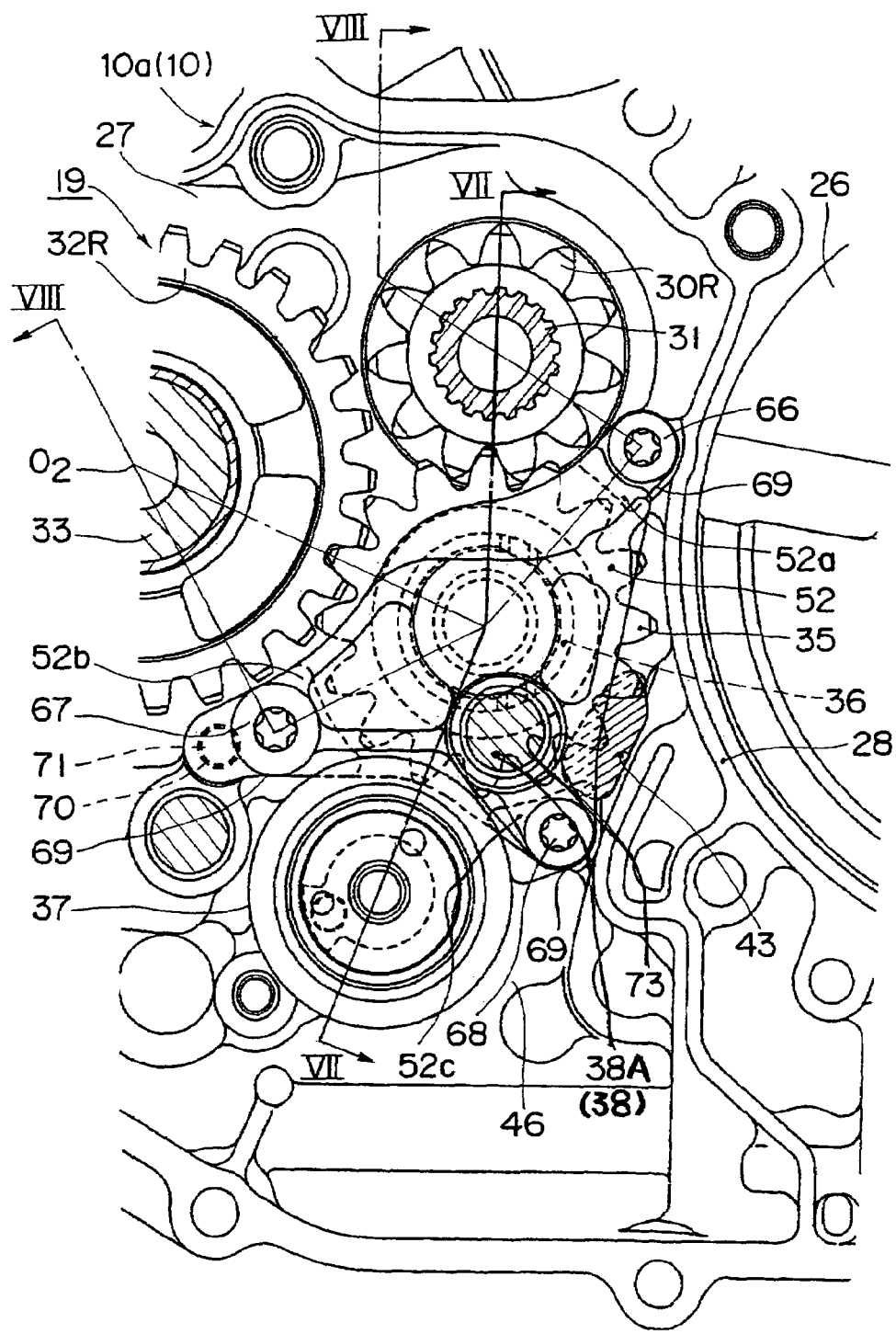
FIG. 6 is an enlarged view of FIG. 3, showing a reverse idle gear for backward movement and a the surrounding area.
Figure 8:
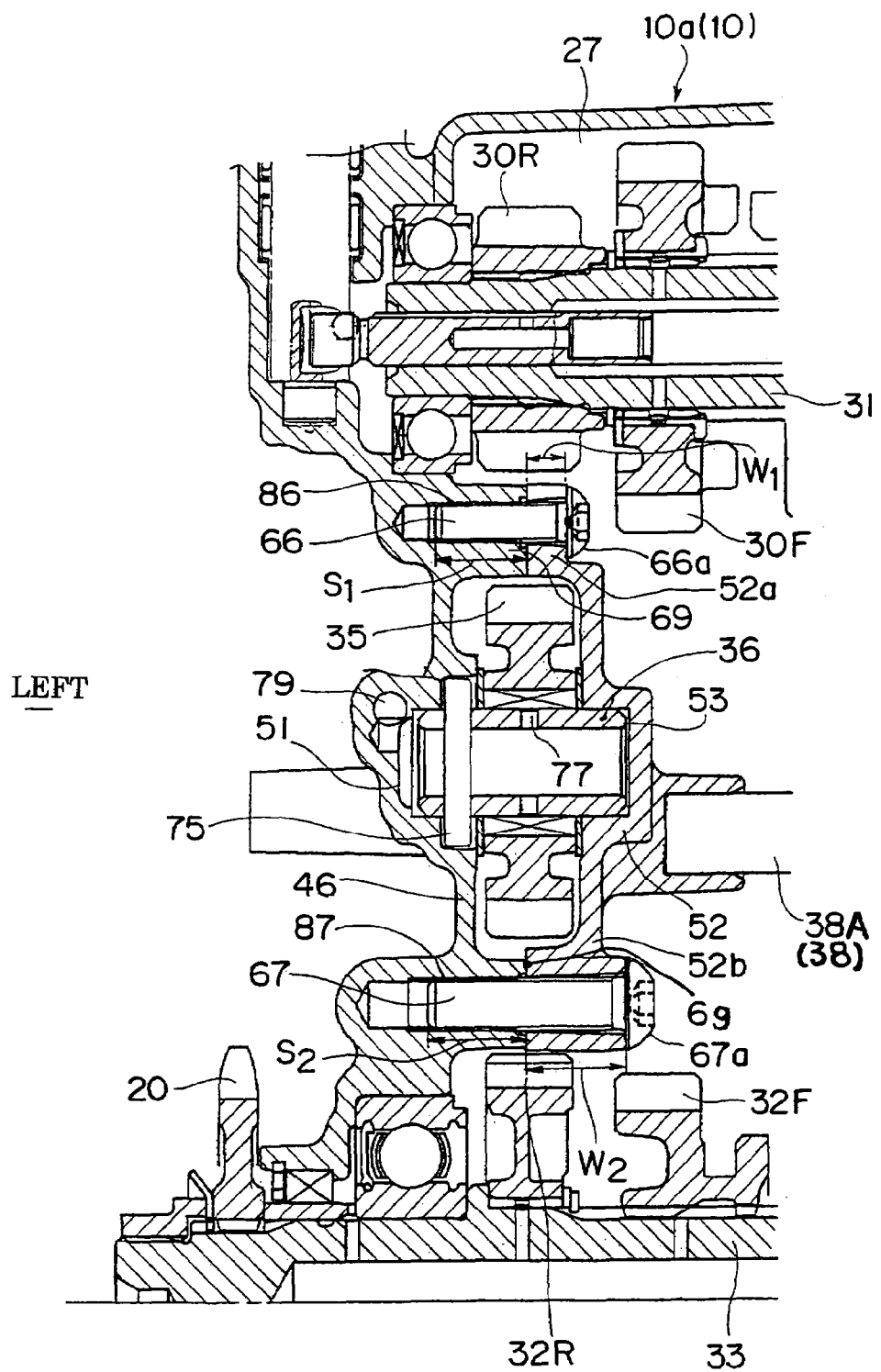
FIG. 8 is a developed cross-sectional view taken along line VIII-VIII of FIG. 6.
Figure 9:
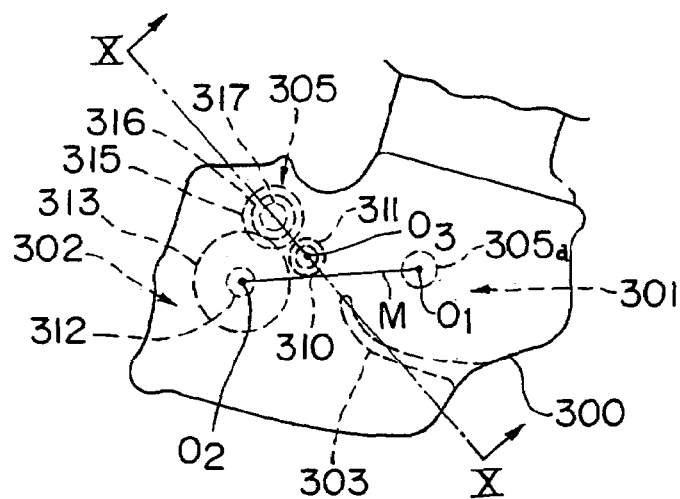
FIG. 9 is a right side view of a prior art of an engine for a vehicle.
Figure 10:
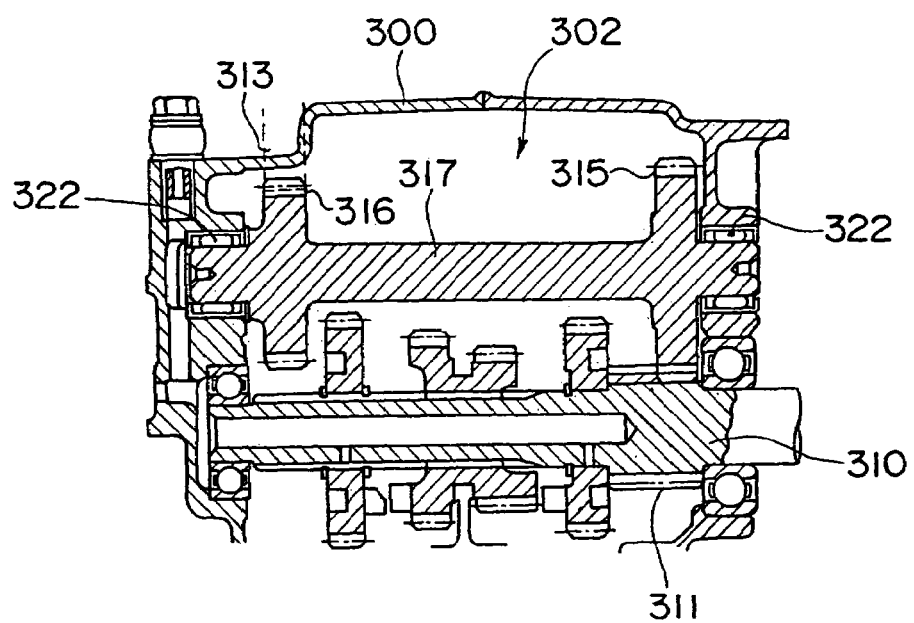
FIG. 10 is an enlarged view in section taken along line X-X of FIG. 9.

FIG. 6 is an enlarged view of the reverse idle gear 36 and surrounding area, FIG. 7 is a cross-sectional view taken along line VII-VII of FIG. 6, and FIG. 8 is a cross-sectional view taken along line VIII-VIII of FIG. 6. In FIG. 6, the shaft holder 52 integrally has first, second and third mounted portions 52a, 52b and 52c for mounting the shaft holder 52 to the crankcase 10. The first mounted portion 52a is extended forward and upward into a space between the reverse drive gear 30R and the partition wall 28, the second mounted portion 52b is extended backward and downward into a space between the reverse driven gear 32R and the change drum 37, and the third mounted portion 52c is extended forward and downward into a space between the change drum 37 and the partition wall 28. Tip portions of the mounted portions 52a, 52b, and 52c are fastened to shaft holder mounting surfaces 69 of the left side wall 46 of the crankcase 10 by first, second, and third mounting bolts 66, 67 and 68, respectively (refer FIG. 8). A positioning hole 70 for the shaft holder 52 is formed on an extended tip portion of the second mounted portion 52b beyond the second mounting bolt 67. A positioning pin 71 mounted on the crankcase 10 is fitted in the positioning hole 70. A support recess portion 73 (refer FIG. 7) for supporting a left end of the front shift fork shaft 38 is integrally formed in the shaft holder 52.

In FIG. 7, a whirl-stop pin 75 extended through the reverse idle shaft 36 in a diameter direction is fixed to the left end of the revere idle shaft 36. Both ends of the whirl-stop pin 75 are engaged with a whirl-stop recess portion 76 formed in the support recess portion 51, thereby preventing rotation of the reverse idle shaft 36 for backward movement. The reverse idle shaft 36 is formed in a tubular shape and has an oil hole 77 communicating with a fitted portion of the needle bearing 55. The oil hole 77 communicates with the support recess portion 51 via the inside of the reverse idle shaft 36. The support recess portion 51 communicates with an oil supply passage 79 formed in the left side wall 46 of the crankcase 10.

In FIG. 8, the first and second mounting bolts 66 and 67 for fastening the first and second mounted portions 52a and 52b of the shaft holder 52 have heads 66a and 67a respectively. Each of heads 66a and 67a is an oval countersunk head having a planar top surface provided with a star-shaped hole (or a hexagonal hole) for tool engagement. The shaft holder mounting surfaces 69 formed in the left side wall 46 of the crankcase 10 have female screw holes 86 and 87, respectively, and are formed to protrude rightward by a predetermined height from the inner surface (right surface) of the left side wall 46. This can prevent the thickness of the first and second mounted portions 52a and 52b in the axial direction from being increased. Screwed amounts S1 and S2 of the mounting bolts 66 and 67 screwed into the shaft holder mounting surfaces 69 are increased. Thereby, the mounting strength of the shaft holder 52 and the support strength of the reverse idle shaft 36 are increased.

A thickness W1 of the first mounted portion 52a is formed to be smaller than a thickness W2 of the second mounted portion 52b. The first mounting bolt 66 inserted into the first mounted portion 52a has a diameter and an axial length which are smaller than those of the second mounting bolt 67 inserted into the second mounted portion 52b. This can prevent the head 66a of the first mounting bolt 66 from interfering with the forward drive gear 30F adjacent to the reverse drive gear 30R. Although not shown, the shaft holder mounting surface 69 for mounting the third mounted portion 52c in FIG. 6 is formed to have the same height as that of the shaft holder mounting surfaces 69 in FIG. 8. The mounting bolt 68 (FIG. 6) having a small size similar to that of the first mounted arm portion 52a is used.

When the vehicle is driven, rotation power of the crankshaft 25 in the crankshaft room 26 (FIG. 5) is transmitted to the input shaft 31 of the gear transmission 19 through a crank gear 25b (FIG. 4), a clutch input gear 44a and the multi disc friction clutch 44, and is shifted by the gear transmission 19, then further transmitted to the rear wheels 3 (FIG. 1) through the output sprocket 20 and the drive chain 21 on the output shaft 33.

When the vehicle moves (travels) forward, the rotation power of the crankshaft 25 is transmitted from any one of the forward drive gears 30F on the input shaft 31 to the output shaft 31 via the corresponding forward driven gears 32F.

When the vehicle moves backward, the rotation power of the crankshaft 25 is transmitted from the reverse drive gear 30R on the input shaft 31 to the output shaft 33 through the reverse idle gear 35 on the reverse idle shaft 36 and the reverse driven gear 32R. As a result, the output shaft 33 is rotated in the opposite direction of forward driving.

In FIG. 4, before the left and right crankcase members 10a and 10b are coupled to each other, the input shaft 31, the output shaft 33, the change drum 37 and the shift fork shafts 38 are preassembled to the right crankcase member 10b, meanwhile the shaft holder 52, the reverse idle shaft 36 and the reverse idle gear 35 are preassembled to the left crankcase member 10a. Namely, as shown in FIG. 8, the right end of the reverse idle shaft 36 provided with the reverse idle gear 35 is fitted in the support recess portion 53 of the shaft holder 52. The left end of the reverse idle shaft 36 is fitted in the support recess portion 51 of the left crankcase member 10a. The mounted portions 52a, 52b, and 52c (FIG. 3) of the shaft holder 52 are fastened to the shaft holder mounting surfaces 69 by the first, second and third mounting bolts 66, 67, and 68, respectively. The reverse idle shaft 36 and the reverse idle gear 35 are mounted only on the left crankcase member 10a. Thereby, the reverse idle shaft 36 and the reverse idle gear 35 can be easily mounted to the crankcase 10.

Then, when the left and right crankcase members 10a and 10b are coupled to each other as shown in FIG. 4, the left ends of the input shaft 31, the output shaft 33 and the shift fork shafts 38 preassembled to the right crankcase member 10b are assembled to the left crankcase member 10a. In the coupling operation, the reverse idle gear 35 pre-mounted on the left crankcase member 10a needs to be engaged with the reverse drive gear 30R and the reverse driven gear 32R which are pre-mounted on the right crankcase member 10b. Thereat, the operator inserts fingers into the operating hole 43, shown in FIGS. 2 and 5, to rotate the reverse idle gear 35 and can easily engage them. Finally, the generator cover 16 is attached to close the operating hole 43, thereby preventing oil from being leaked from the operating hole 43.

In FIG. 3, during running of the vehicle, the oil reserved in the oil reservoir in the transmission room 27 is pumped up to the lubricated portions in the engine E, e.g., the main bearing of the crankshaft 25 and the gear fitted portions of the gear transmission 19, by an oil pump, not shown, and is used for lubrication and cooling of the lubricated portions. The oil used for lubrication is returned to the oil reservoir of the transmission room 27 directly or by a scavenging pump (not shown). Part of the pumped oil in the lubricated portions by the oil pump is supplied from the oil supply passage 79 in the left crankcase member 10a in FIG. 7 to the needle bearing 55 of the reverse idle gear 35 through the inside of the support recess portion 51, the inside of the reverse idle shaft 36 and the oil hole 77.

In FIG. 3, the drive gears 30, the driven gears 32 and the reverse idle gear 35 of the gear transmission 19 are arranged above the oil level L1 in the transmission room 27 and are not immersed in the oil in the oil reservoir. With this configuration, the drive gears 30, the driven gears 32 and the reverse idle gear 35 of the gear transmission 19 can be hardly subjected to stirring resistance of the oil in the oil reservoir during driving of the vehicle, and can prevent lowering of the gear transmission efficiency of the rotation power from being lowered.

Moreover, the partition wall 28 for partitioning the crankshaft room 26 and the transmission room 27 is continuously formed from the top wall to the bottom wall of the crankcase 10. With this configuration, during driving the vehicle, even if the oil in the transmission room 27 is waved or moved in the front, rear, left, or right directions due to vibration or tilt of the vehicle, the oil is prevented to flow from the oil reservoir into the crankshaft room 26 and the generator case 17.

As shown in FIG. 3, since the reverse idle gear 35 is arranged by effectively using an available space surrounded by the reverse drive gear 30R, the reverse driven gear 32R and the partition wall 28, the size of the engine in the vertical and horizontal directions can be reduced to the size of the gear transmission without the gear train for backward movement. In particular, the ground clearance of the engine for vehicle can be enlarged.

In FIG. 3, since the axis O2 of the input shaft 31 and the axis O4 of the reverse idle shaft 36 are arranged so as to be substantially symmetric with respect to the reference line M connecting the axis O1 of the crankshaft 25 and the axis O2 of the output shaft 33, the gear transmission 19 and the engine E can be more compact, as seen in the crankshaft direction.

In FIG. 4, since the crankcase 10 is divided into the left and right crankcase members 10a and 10b, and the reverse idle shaft 36 is straddle-supported by the left wall 46 of the left crankcase member 10a and the shaft holder 52 fixed to the left side wall 46, the reverse idle gear 35 and the reverse idle shaft 36 can be easily assembled, and the reverse idle shaft 36 becomes shorter to reduce the weight and the shaft arrangement space. Further, since the reverse idle shaft 36 becomes shorter, as mentioned above, and is straddle-supported, the bending moment of the reverse idle shaft 36 becomes smaller to prevent any gear noise.

In FIG. 3, the shaft holder 52 has the mounted portions 52a, 52b, and 52c extended into a space between the reverse drive gear 30R and the partition wall 28, a space between the reverse driven gear 32R and the change drum 37, and a space between the change drum 37 and the partition wall 28 and the mounted portions 52a, 52b, and 52c are fastened to the left side wall 46 by the mounting bolts 66, 67, and 68. With this configuration, the shaft holder 52 can be arranged using a space between the members of the gear transmission 19, thereby, the gear transmission 19 and the engine E can be more compact, as seen in the axial direction.

The left side wall 46 of the crankcase 10 is provided with the shaft holder mounting surfaces 69 protruded toward the shaft holder 52 in the crankshaft direction, and the mounted portions 52a, 52b, and 52c of the shaft holder 52 are fastened to the shaft holder mounting surfaces 69. With this configuration, the screwed amounts S1 and S2 of the mounting bolts 67, 68, and 69 can be enlarged, and the thickness of the mounted portions 52a, 52b and 52c in the crankshaft direction can be reduced. Thereby, the mounting strength of the shaft holder 52 and the reverse idle shaft 36 can be improved.

The engine for vehicle according to the present invention is not limited to an engine for straddle-type four wheeled vehicle and is applicable to an engine for motorcycle or straddle-type three wheeled vehicle.

The present invention is not limited to the above-described preferred embodiments, and therefore, encompasses various modifications within the scope without departing from the spirit of the invention as defined in the appended claims.

What is claimed is:

1. An engine for a vehicle comprising:
a crankcase having a crank room for housing a crankshaft, the crankshaft extending in a crankshaft axis direction; and
a transmission room formed rearward of the crank room and partitioned from the crank room by a partition wall, the transmission room housing a gear transmission having a gear train for backward movement and reserving oil of the engine,
wherein the gear train for backward movement has a reverse drive gear provided on an input shaft of the gear transmission, a reverse driven gear provided on an output shaft of the gear transmission, and a reverse idle gear provided on an reverse idle shaft so as to be coupled with the reverse drive gear and reverse driven gear,
wherein the input shaft and the reverse idle shaft are arranged so as to be separated into the upper side and the lower side of a reference line connecting an axis of the crankshaft and an axis of the output shaft, and
wherein the reverse idle gear is arranged entirely in a space surrounded by the reverse drive gear, the reverse driven gear and the partition wall when viewed along the crankshaft axis direction.

2. The engine for the vehicle according to claim 1, wherein the axis of the input shaft and the axis of the reverse idle shaft are arranged so as to be substantially symmetric with respect to the reference line.

3. The engine for the vehicle according to claim 1, wherein both axial ends of the reverse idle shaft are supported by one of side walls of the crankcase in the crankshaft axis direction and a shaft holder fixed to the side wall.

4. The engine for the vehicle according to claim 3, wherein the shaft holder has three mounted portions which are extended, as seen in the crankshaft axis direction, into a space between the reverse drive gear and the partition wall, a space between the reverse drive gear and a change drum for shifting a gear position of the gear transmission and positioned below the reverse idle shaft, and a space between the change drum and the partition wall respectively, and are mounted on the side wall by mounting bolts.

5. The engine for the vehicle according to claim 4, wherein the side wall has mounting surfaces for mounting portions of the shaft holder, the mounting surfaces protrude toward the shaft holder in the crankshaft axis direction, the mounted portions of the shaft holder are fixed on the mounting surfaces of the side wall.

6. The engine for the vehicle according to claim 1, wherein the lower end of the reverse idle gear is positioned above an oil level of the oil reserved in the transmission room at least during operation of the engine.

7. An engine for a vehicle comprising:
a crankcase having a crank room for housing a crankshaft; and
a transmission room formed rearward of the crank room and partitioned from the crank room by a partition wall, the transmission room housing a gear transmission having a gear train for backward movement and reserving oil of the engine, the gear train having a reverse drive gear provided on an input shaft of the gear transmission, a reverse driven gear provided on an output shaft of the gear transmission, and a reverse idle gear provided on a reverse idle shaft so as to be coupled with the reverse drive gear and reverse driven gear,
wherein the input shaft and the reverse idle shaft are arranged so as to be separated into the upper side and the lower side of a reference line connecting an axis of the crankshaft and an axis of the output shaft and the axis of the input shaft and the axis of the reverse idle shaft are arranged so as to be substantially symmetric with respect to the reference line, and
wherein the reverse idle gear is arranged in a space surrounded by the reverse drive gear, the reverse driven gear and the partition wall.

8. An engine for a vehicle comprising:
a crankcase having a crank room for housing a crankshaft; and
a transmission room formed rearward of the crank room and partitioned from the crank room by a partition wall, the transmission room housing a gear transmission having a gear train for backward movement and reserving oil of the engine,
wherein the gear train for backward movement has a reverse drive gear provided on an input shaft of the gear transmission, a reverse driven gear provided on an output shaft of the gear transmission, and a reverse idle gear provided on a reverse idle shaft so as to be coupled with the reverse drive gear and reverse driven gear, the input shaft and the reverse idle shaft being arranged so as to be separated into the upper side and the lower side of a reference line connecting an axis of the crankshaft and an axis of the output shaft,
wherein the reverse idle gear is arranged in a space surrounded by the reverse drive gear, the reverse driven gear and the partition wall, and both axial ends of the reverse idle shaft are supported by one of side walls of the crankcase in a crankshaft axis direction and a shaft holder fixed to the side wall, and
wherein the shaft holder has three mounted portions which are extended, as seen in the crankshaft axis direction, into a space between the reverse drive gear and the partition wall, a space between the reverse drive gear and a change drum for shifting a gear position of the gear transmission and positioned below the reverse idle shaft, and a space between the change drum and the partition wall respectively, and are mounted on the side wall by mounting bolts.

9. The engine for the vehicle according to claim 8, wherein the side wall has mounting surfaces for mounting portions of the shaft holder, the mounting surfaces protrude toward the shaft holder in the crankshaft axis direction, the mounted portions of the shaft holder are fixed on the mounting surfaces of the side wall.

* * * * *